United States Patent
Brogden et al.

(10) Patent No.: US 10,708,301 B2
(45) Date of Patent: Jul. 7, 2020

(54) METHOD OF, AND APPARATUS FOR, SECURE ONLINE ELECTRONIC COMMUNICATION

(71) Applicant: ALWAYS ORGANISED LTD., Gerrards Cross (GB)

(72) Inventors: Andrew Brogden, Gerrards Cross (GB); Huw Parker, The Hague (NL)

(73) Assignee: Always Organised Ltd., Gerrards Cross (GB)

( * ) Notice: Subject to any disclaimer, the term of this patent is extended or adjusted under 35 U.S.C. 154(b) by 68 days.

(21) Appl. No.: 15/079,939

(22) Filed: Mar. 24, 2016

(65) Prior Publication Data

US 2017/0279810 A1  Sep. 28, 2017

(51) Int. Cl.
*H04L 29/06* (2006.01)
*H04W 4/14* (2009.01)
*H04L 12/58* (2006.01)

(52) U.S. Cl.
CPC ........ *H04L 63/1483* (2013.01); *H04L 63/083* (2013.01); *H04L 63/0807* (2013.01); *H04L 63/0876* (2013.01); *H04W 4/14* (2013.01); *H04L 51/04* (2013.01); *H04L 2463/082* (2013.01)

(58) Field of Classification Search
CPC . H04L 63/102; H04L 63/1483; H04L 63/123; H04L 51/04; H04L 63/0876; H04W 4/14
See application file for complete search history.

(56) References Cited

U.S. PATENT DOCUMENTS

| | | | | |
|---|---|---|---|---|
| 5,655,077 | A * | 8/1997 | Jones | G06F 21/6236 726/8 |
| 6,178,418 | B1 * | 1/2001 | Singer | G06F 16/252 |
| 8,830,057 | B1 * | 9/2014 | Poursohi | G08B 21/182 340/540 |
| 9,654,450 | B2 * | 5/2017 | Ford | H04L 63/08 |
| 2005/0096790 | A1 * | 5/2005 | Tamura | G06N 3/008 700/245 |
| 2007/0266425 | A1 * | 11/2007 | Cho | H04L 63/083 726/4 |
| 2007/0300292 | A1 * | 12/2007 | Scipioni | G06F 21/31 726/5 |
| 2014/0235355 | A1 * | 8/2014 | Wang | A63F 13/12 463/42 |
| 2014/0259190 | A1 * | 9/2014 | Kiang | G06F 21/6218 726/30 |

(Continued)

*Primary Examiner* — Abu S Sholeman
(74) *Attorney, Agent, or Firm* — Conley Rose, P.C.

(57) ABSTRACT

A method for secure electronic communication between one or more clients on one or more client computing devices. The method includes establishing a networked secure exchange server, where the networked secure exchange server comprises one or more secure electronic data exchange environments for communication between one or more clients. The method also includes providing, on one or more client computing devices, a client authentication interface operable to enable one or more authorized clients to access one or more of the secure electronic data exchange environments across a network, and enabling one or more of the authorized clients to exchange electronic communications through one or more secure electronic data exchange environments.

16 Claims, 5 Drawing Sheets

(56) References Cited

U.S. PATENT DOCUMENTS

| | | | | |
|---|---|---|---|---|
| 2015/0135300 A1* | 5/2015 | Ford | ............... | G06F 16/93 |
| | | | | 726/11 |
| 2015/0273704 A1* | 10/2015 | Inaba | ............... | B25J 9/161 |
| | | | | 700/264 |
| 2016/0105420 A1* | 4/2016 | Engan | ............... | H04L 9/3228 |
| | | | | 455/411 |
| 2017/0282380 A1* | 10/2017 | Uetabira | ............... | B25J 9/0006 |

* cited by examiner

METHOD OF, AND APPARATUS FOR, SECURE ONLINE ELECTRONIC COMMUNICATION

The present disclosure relates to a method of, and apparatus for, secure online communication. More particularly, the present disclosure relates to a method of, and apparatus for, secure online communication between parties utilizing electronic devices.

BACKGROUND

Email "phishing" and other fraudulent and/or malicious activities are increasingly problematic in online environments. In order to mitigate such activity, a number of strategies have been implemented. For example, increasingly complex password or login routines are now commonplace, where the user must enter a number of different pieces of information to gain access to their email account or other online account. Alternatively, it is not uncommon for users to have multiple accounts to attempt to mitigate their exposure to online fraud.

However, known methods suffer from a number of drawbacks. Users generally dislike the inconvenience and effort of changing online accounts or managing multiple accounts. Further, there is evidence that increasingly complex password rules encourage users to re-use passwords across multiple accounts, significantly increasing the exposure of those accounts to online fraud and malicious activities should a password be obtained by a fraudster.

SUMMARY

Accordingly, there is a technical problem in the art that current electronic communication methods are prone to human error and fraudulent attacks. The present disclosure is operable to mitigate these effects whilst providing ease and convenience for a user.

According to a first aspect of the present disclosure there is provided a method for secure electronic communication between one or more clients on one or more client computing devices, the method comprising the steps of: establishing a networked secure exchange server, the networked secure exchange server comprising one or more secure electronic data exchange environments for communication between one or more clients; providing, on one or more client computing devices, a client authentication interface operable to enable one or more authorized clients to access one or more secure electronic data exchange environments across a network; and enabling one or more authorized clients to exchange electronic communications through one or more secure electronic data exchange environments.

In one embodiment, the method further comprises: providing an authentication process operable to authenticate one or more clients on one or more secure electronic data exchange environments.

In one embodiment, the authentication process comprises: storing, in a database of the networked secure exchange server, client authentication data; receiving, from a client through a client authentication interface, login information; determining whether said client login information is associated with the secure electronic data exchange environment; if so determined, requesting further login information from the client through the client authentication interface; validating said further login information; and providing access to the secure electronic data exchange environment if said further login information is validated.

In one embodiment, for subsequent authentication processes through the said client authentication interface, only the further login information is required to enable the client to access the secure electronic data exchange environment.

In one embodiment, one or more secure electronic data exchange environments and/or one or more clients are associated with an organization.

In one embodiment, the or each client authentication interface for the or each secure electronic data exchange environment is specific to the associated organization.

In one embodiment, only clients associated with an organization are able to access the secure electronic data exchange environment for that organization.

In one embodiment, the client authentication interface is configured to display to authorized clients a log of all client communication within a respective secure electronic data exchange environment.

In one embodiment, each authenticated client has an email address specific to the relevant secure electronic data exchange environment and/or each secure electronic data exchange environment has an associated email address.

In one embodiment, the secure electronic data exchange environment is further configured such that electronic communications can be sent to the associated email address of said authorized clients and/or said secure electronic data exchange environment.

In one embodiment, the method further comprises the steps of: storing, in a database of the networked secure exchange server, authorized external communication addresses associated with said secure electronic data exchange environment; receiving a communication from an external communication address; determining whether said communication is from an authorized external communication address; and if so determined, enabling said communication to be accessible by authorized clients within the secure electronic data exchange environment.

In one embodiment, said communication from an external communication address is added to a communication log within said secure electronic data exchange environment.

In one embodiment, one or more authorized clients are notified when electronic communications are exchanged within an associated electronic data exchange environment.

In one embodiment, the said notification comprises sending a communication to an electronic address external to said secure electronic data exchange environment and secure exchange server.

In one embodiment, said electronic address comprises an external email address and/or an SMS number.

In one embodiment, the content of the communication sent to the electronic address external to said secure electronic data exchange is determined in dependence upon a privacy level associated with the or each authorized client and/or the secure electronic data exchange environment.

In one embodiment, the communication sent to the electronic address external to said secure electronic data exchange comprises an electronic link to the respective client authentication interface.

According to a second aspect of the present disclosure, there is provided a non-transitory computer readable medium comprising instructions configured when executed to perform the method as claimed in the first aspect.

According to a third aspect of the present disclosure, there is provided a computer readable medium comprising instructions configured when executed to perform the method of the first aspect.

According to a fourth aspect of the present disclosure, there is provided a networked secure exchange server comprising a processor device and a data storage device, the processor device being configured to execute the method of the first aspect.

BRIEF DESCRIPTION OF THE DRAWINGS

Embodiments of the present disclosure will now be described in detail with reference to the accompanying drawings, in which.

DETAILED DESCRIPTION

There is presented herein a method of, and apparatus for, enhancing the security of online communications and exchanges against outside attacks such as email phishing and fraudulent attacks.

The present disclosure relates to a method of, and apparatus for, improving online security. The method utilizes two independent logon approaches which reduces the opportunity for online fraud. Further, the method of the present disclosure provides the user with an easily-identified user interface so that a user can easily determine whether the site he/she is accessing is genuine.

Figure 1:
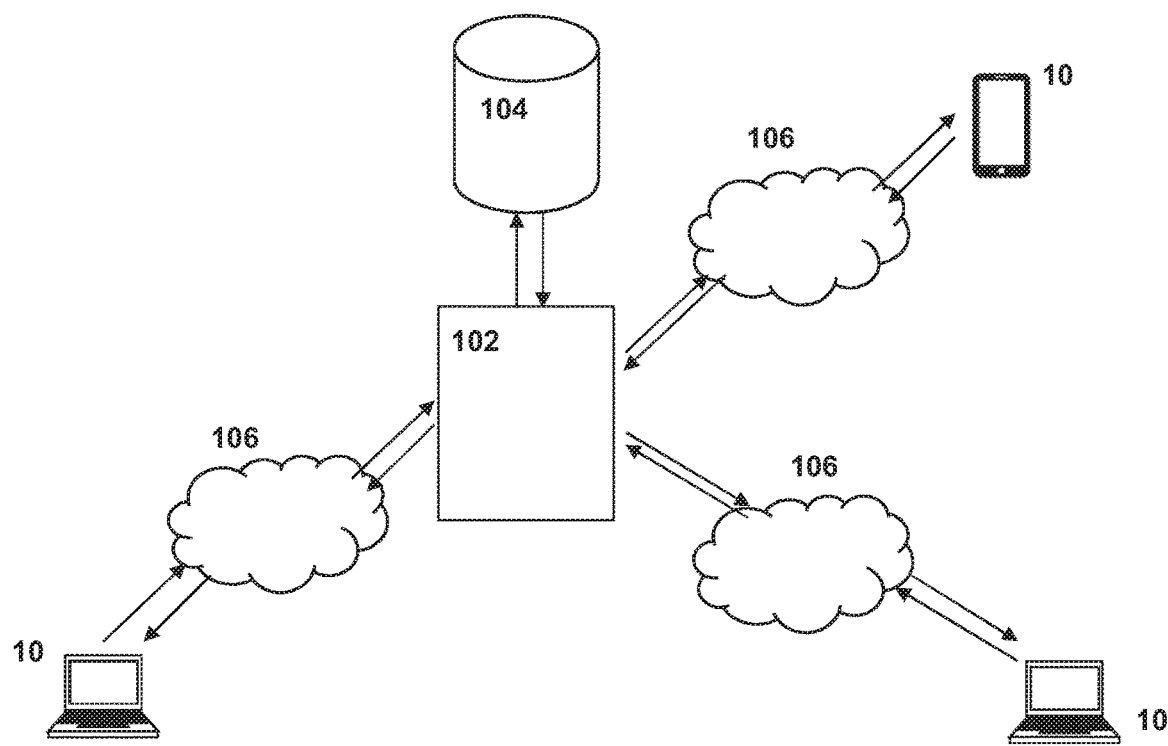
FIG. 1 is a schematic diagram of a computer system in accordance with embodiments of the present disclosure.

FIG. 1 shows a general schematic view of the operation of the present disclosure. FIG. 1 shows a plurality of client devices 10 and a computing system 100. The computing system 100 comprises a secure server 102 and secure database 104.

The plurality of client devices 10 connect to the secure server 102 through a network 106. The network 106 may take a number of forms, for example, the internet, a cable network or a mobile network. The network 106 enables each user of each client computer 10 to communicate with the secure server 102.

The secure server 102 may be any suitable computer device, system, collection of computing devices or collections of computing system and may, in non-limiting examples, comprise any one or more of: one or more processors; one or more hardware or software controller devices; one or more memory devices; one or more user input devices; one or more output devices; and one or more communication devices.

Any one or more of the processor, controller, or memory may be a physical, non-transitory, device or apparatus. The devices/apparatus may be electronic, opto-electronic or optical.

The processor may, in principle, be any suitable processing device such as, but not limited to, a microprocessor, an application-specific instruction-set processor, a graphics processing unit (GPU/VPU), a physics processing unit (PPU), a digital signal processor, a network processor, a front end processor. Examples of processors include, but are not limited to, an Intel® processor, an AMD® processor.

The controller may be any suitable controller including any one or more of a controller chip, a controller board, a mainframe controller, an external controller or any other suitable controller. The controller may be, for example, a micro-controller.

The memory may, in principle be any suitable memory including any one or more of: mechanical memory such as, but not limited to, magnetic tape drive, hard-drive, optical drive; volatile and non-volatile memory such as, but not limited to, RAM, DRAM, SRAM, SDRAM, T-RAM, Z-RAM, TTRAM, ROM, Mask ROM, PROM, EPROM, EEPROM, NVRAM.

The database 104 may comprise data storage devices such as, for example, an individual hard drive or a collection of hard disk drives (HDDs) linked together through a protocol such as Redundant Array of Inexpensive Disks (RAID) to form a logical unit. The database 104 may comprise a plurality of data storage devices connected across a storage network (not shown).

Alternatively, the database 104 may be local to the secure server 102 but with access to a remote data store (not shown) for storage of larger files and full communication histories.

The client devices 10 may take any suitable form; for example, desktop computers, laptop computers, mobile telephones, smartphones, tablet computers or other computing devices.

In use, users are able to send electronic communications between client devices 10 via the secure server 102 and database 104. These electronic communications may comprise, in non-limiting embodiments: emails; SMS messages; instant messaging; video communications; file sharing; and audio/video recording.

In contrast to known arrangements, the electronic communications may be sent from the user's existing address (e.g. email address, instant messenger account or mobile phone) but are redirected through the secure server 102 and database 104 which is operable to log the electronic communication and verify user authenticity, before the communication is sent to the recipient.

For example, a user may wish to use his or her own personal email address to send an email to a colleague at their own personal email address, but to do so with additional security. By utilizing the approach of the present disclosure, the email communication between sender and recipient is re-routed through a private secure server 104 which is operable to verify the sender and recipient and provide a private communication channel for the sender and recipient to communicate therethrough. The components of the computing system will be discussed in further detail below.

User Interface

Figure 2:
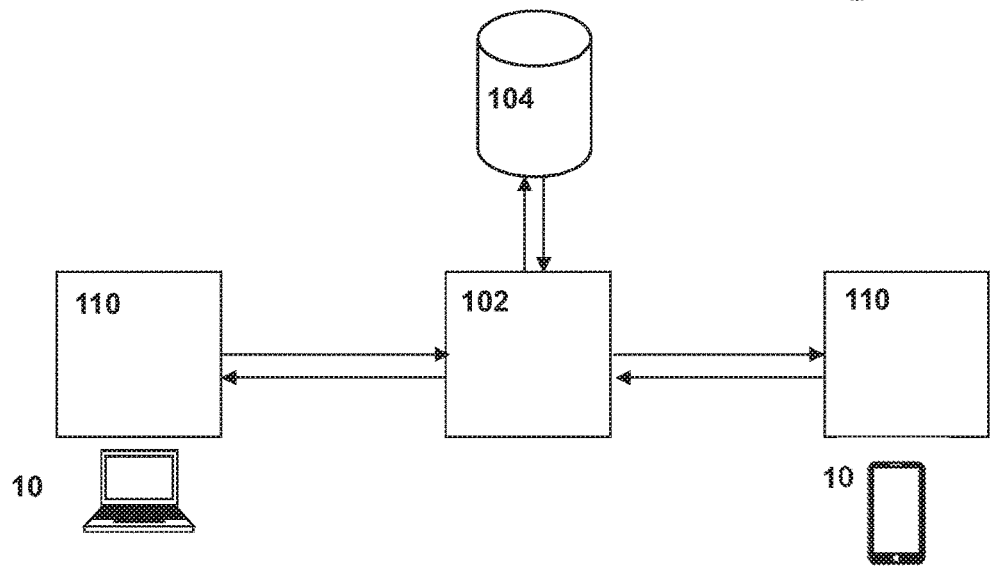
FIG. 2 is a more detailed schematic diagram of the computer system of FIG. 1 in accordance with embodiments of the present disclosure.

FIG. 2 shows a more detailed schematic illustration of the computing system 100 according to an embodiment of the present disclosure. The secure server 102 and database 104 are central to the implementation and are accessible through a user interface 110 presented to the user of a client device 10.

The user interface 110 is specific to the particular client device 10 (e.g. smartphone, tablet, PC etc.) that is being used, as will be discussed below. The user interface 110 provides a portal through which the secure server 102 and secure database 104 can be accessed.

The user interface 110 is operable to communicate with the secure server 102 through GET or POST HTTPS URL requests using a defined Application Programming Interface (API).

In embodiments, the user interface 110 has an environment specific to each company or organization. Based on this, particular settings can be configured in dependence upon the requirements of the organization; for example, specific security levels or company branding.

A company or organization has a unique identifier associated with the company environment. This may be a URL to enable a client computer 10 to access the user interface 110 to enable secure communication, or (in the case of a dedicated application running on a smartphone, for example) a unique company ID may be used to access the company user interface.

A user is assigned a unique identifier identifying that user with a specific company or organization. Depending upon the electronic communication method, this may be an email address associated with the company URL, for example.

User Information and Configuration

Each user within the company environment has a number of key identifying data elements. In embodiments, each user has a user ID (e.g. username), a password and a PIN.

A user may have one or more pre-defined types. For example, a user may have different levels of administrator privileges as required to operate the system effectively.

Alternatively, a distinction may be made between agents of the company and clients of the company to provide the agents with visibility of internal company-specific information not available to clients.

Privileges may be defined as required. Non-exhaustively, these may include a number of access or control rights including: right to view one or more user accounts or communications; right to reset passwords or any PIN numbers; right to set up new relationships.

User Relationships

Within the company environment, information is only shared between users in pre-defined relationships. A user may have one of three pre-defined relationships within the company environment: a solo relationship, a one-to-one relationship and a group relationship.

A solo relationship is where communication is restricted to a single individual such that the information is private to that individual.

A one-to-one relationship is a pre-defined relationship whereby two users are in private communication with each other and no other parties can access the said communication.

A group relationship is a pre-defined relationship where a multiplicity of users is engaged in communication. However, only the users authorized to view the communication may do so, with the communication remaining private with respect to any users not in the group.

User Interface

Within the user interface 110, as configured by the company environment, a user may view one or more communications that the user is party to or authorized to view.

User communications are grouped by relationship. Within a given relationship, the user is able to view a communication log showing the history of communication within that relationship. For example, in a one-to-one email relationship, a log of sent/received emails will be visible to the user.

This enables a user to verify the authenticity of the user interface 110 environment. If, for example, a fraudster was even to attempt to mimic the user interface environment, it would be intractably difficult for the fraudster to mimic the chain of email communication within a relationship. Therefore, the fact that the interface was not genuine and was fraudulent would be immediately apparent to the user.

Further, the communication log provides an audit trail. If a hacker was able to access a particular account, any fraudulent actions would be readily identifiable from the interface.

Server and Database

The server 102 is a secure server and can only be accessed by a user through the user interface 110 if the user has the correct authentication details, e.g. username, password and PIN. The login process will be described in detail below.

Figure 3:
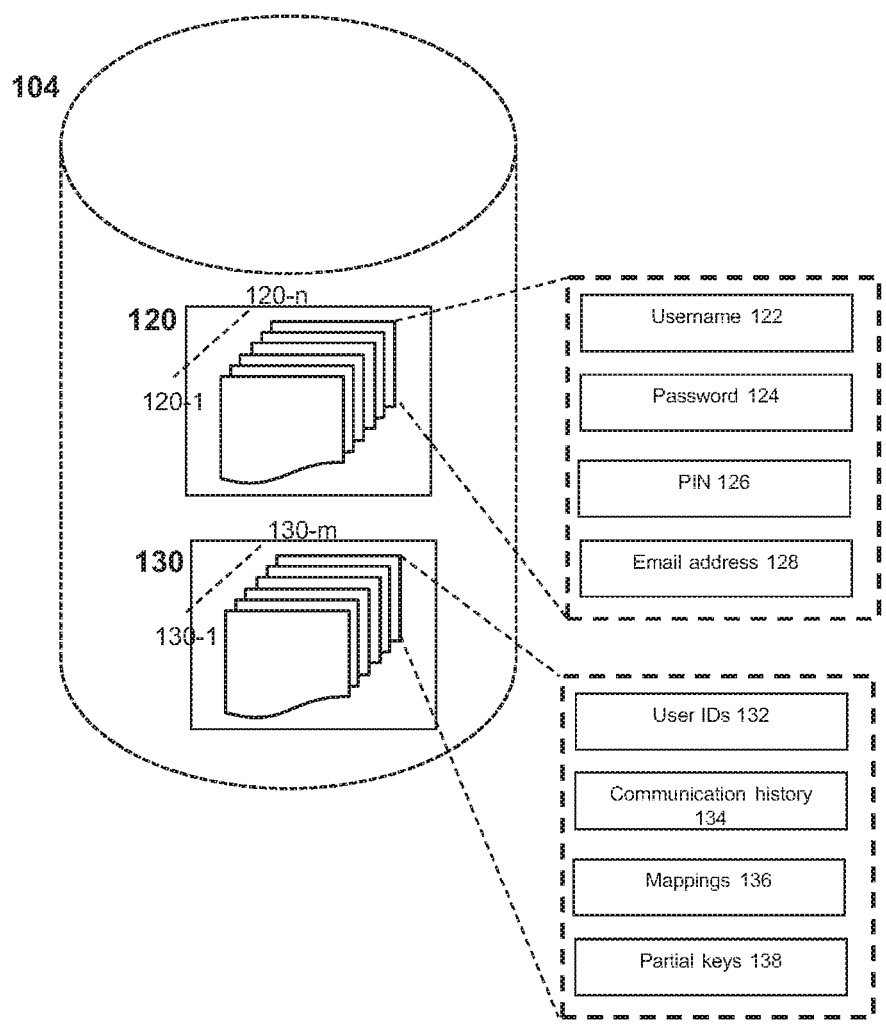
FIG. 3 is a schematic diagram of the log records within the secure database in accordance with embodiments of the present disclosure.

FIG. 3 shows a schematic of the secure database 104. The database 104 has a user ID log table 120 comprising details of all valid user IDs 120-$n$ (where n=1 to i) on the system. Parameters associated with each user ID include: user name 122; password 124; PIN 126; and email address 128.

The database 104 also stores a relationship ID log table 130 comprising details of all user relationships. Parameters associated with each relationship ID are: list of user IDs associated with each relationship ID 130-$m$ (where m=1 to i); communication history 134; mappings 136 to any files associated with the communication history 134; and partial keys 138 to any mapped files.

Any files associated with relationships may be, optionally, stored on the database 104. However, this need not be the case and other arrangements are within the scope of the present disclosure. For example, the mapped files may be stored on a separate server or data store, either local or connected over a network such as a LAN or the internet. Any such files are encrypted and so cannot be accessed without the partial keys 138 stored in the database 104.

Authentication Method

Figure 4:
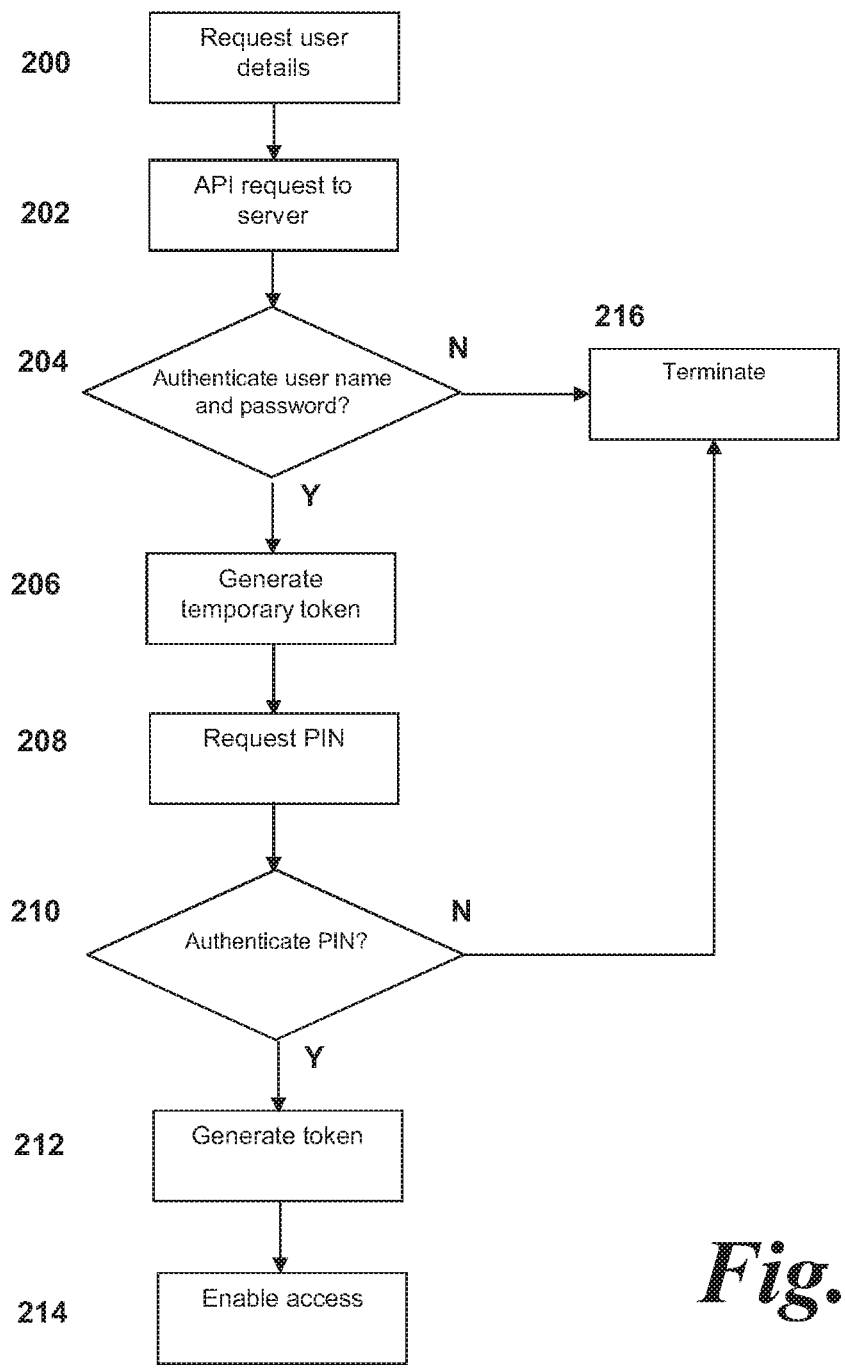
FIG. 4 is a flowchart illustrating a method in accordance with embodiments of the present disclosure.
Figure 5:
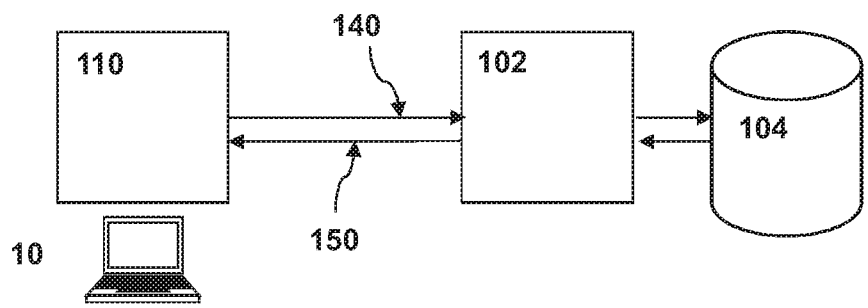
FIG. 5 is a schematic diagram illustrating the authentication process shown in FIG. 4 in accordance with embodiments of the present disclosure.

The method for logging into the secure server 102 and database 104 will now be described with reference to FIGS. 4 and 5. FIG. 4 is a flow chart showing the process for logging in to the secure server 102 and database 104. FIG. 5 shows an exemplary diagram of the components of the system 100 involved in the login process. It is to be noted that the embodiment of FIG. 4 is exemplary and the steps of the method may be executed in any suitable order as would be apparent to the skilled person.

Step 200: Request User Details

At step 200, the user enters their username and password into the user interface 110. The general process is the same irrespective of the computing device 10 used by the user.

Additionally or alternatively, the username could be the user's existing email address. By utilizing this approach, the user's external (i.e. external to the secure server 102 and database 104) email address can be logged on the system for future use. When the username and password have been entered by the user, the method proceeds to step 202.

Step 202: API Request to Server

At step 202, an API (application program interface) request 140 is made to the server 102 based on the details supplied by the user.

The user interface 110 is operable to communicate with the secure server 102 through GET or POST HTTPS URL requests using a defined Application Programming Interface (API). The method proceeds to step 204.

Step 204: Authenticate Username and Password

The server 102 is operable to check the combination of company (through the company environment portal of the user interface 110), the username and password. If the combination exists in the database 104, the first stage of authentication is successful and the method proceeds to step 206. If the combination does not exist, the login fails and method proceeds to step 216 where the process terminates.

Step 206: Generate Temporary Authentication Token

At step 206, the combination of company, username and password entered by the user has been confirmed as valid. On this basis, a temporary authentication API token is generated and stored by the secure server 104. The token is also sent to the user interface API on the client device 10. In non-limiting embodiments, the token is sent in json format. The method proceeds to step 208.

Step 208: Request PIN

At step 208, responsive to receiving the temporary authentication API token, a request for the user to enter their personal identification number (PIN) is made. The user then enters a PIN and the method proceeds to step 210.

Step 210: Authenticate PIN

At step 210, it is determined whether the combination of the PIN and temporary API token are valid. If valid, the method proceeds to step 212. If invalid, the login fails and method proceeds to step 216 where the process terminates.

Step 212: Generate Authentication Token

If, at step 210, if the temporary authentication token and PIN are valid, then a full authentication token 150 is generated. The authentication token 150 is generated in accordance with appropriate security protocols and, in non-limiting embodiments, is sent to the user interface 110 in json format.

For example, in an embodiment, the authentication token 150 is a randomly-generated 64 character code. The authentication token 150 is newly generated for each login session and is deleted from the system 100 when the user logs out. The method proceeds to step 214.

Step 214: Enable User Access

At step 214, the authentication token 150 is passed to the user interface 110 of the client computer 10 and the user is authenticated and provided with access to the secure server 102 and database 104.

Step 216: Authentication Fail

At step 216, if either the username/password/company combination check (step 204) or the temporary authentication/PIN check (step 210) fail, then the user has not been validated to access the system 100 and the process ends with a login rejection.

The user may attempt to login to the process for another set number of times (e.g. 3). Optionally, after a set number of unsuccessful attempts to login to the server 102 and database 104, the user may be blocked from further attempts either permanently or for a set period of time.

Login Process

Whilst the above process is generic to all types of client devices, the format of the login process and initiation of the login process differs depending upon the type of client device 10 being used. The following, non-limiting, examples are discussed below.

As described above, each company has a company-specific environment. In the example of an internet browser-based login, this is accessible through a suitable URL which may appear, for example, as a company branded homepage.

For the internet browser, the homepage will contain dialogue boxes for username and password and the method for logging in to the secure server 102 is then carried out in accordance with steps 200-216 above.

Alternatively, the login process can be carried out through an application (or "app"). This may be the case for a smartphone or tablet, and increasingly for desktop and laptop PCs. Once the application is selected and opened, the login details can be entered and the login process completed as set out in steps 200-216 above.

However, since the application is native to the client device 10, it is not necessary to complete the login process each time the user opens the application on the client device 10. The first time the user logs on through the application, they will be required to go through the entire process as set out in steps 200 to 216. However, for subsequent sessions, the initial verification details can be stored by the application and so the initial verification steps do not need to be performed. Therefore, the method may start at step 208 for subsequent login processes from within an application.

Connection to Existing Accounts

Advantageously, the present disclosure enables a user to utilize their existing communication accounts but with an additional layer of privacy.

A user may use their existing email account with the present disclosure. Alternatively or additionally, other communication methods may be used, for example SMS (short messaging service) texts or instant messenger conversations. This list is non-exhaustive and other suitable methods will be readily apparent to the skilled person.

This is facilitated by a number of aspects of the present disclosure. Consider a login process from a user's existing email account.

In the case of email, a user may have previously been privy to a relationship where an email exchange has taken place. In this case, when an email is received from the system, the email will comprise a number of components to enable a user to readily interact with the secure server 102 and relationship.

Consider, for example, an email received from the secure server 102 to a user's existing email address in relation to a specific relationship (e.g. one-to-one or group). In this case, the received email contains a "smart link".

The "smart link" comprises, in embodiments, three elements: a company ID, a page direction and a security verification code.

The company ID may be the company environment "homepage" URL. The page direction may be a link to the browser implementation of the user interface 110 as described above. Finally, the security verification code serves as a security check to negotiate the initial layer of security as set out in steps 200 to 206.

The security verification code could take any suitable form to enable the secure server 102 to determine the authenticity of the user attempting to gain access. In non-limiting embodiments, the security verification code comprises a 64 character code which is randomly generated by the secure server 102.

The security verification code is unique to each smart code and enables the secure server 102 to identify the user and relationship ID(s) to which the user is a party.

Once the user selects the smart link, then, the code is used to complete the initial security check stage as set out in steps 200 to 206 and the user is simply required to complete the final stages of security verification as set out in steps 208 to 216.

A similar principle can be applied to SMS messaging. The message received by the system 100 contains a similar "smart link" which enables a user to complete the initial login process set out in steps 200 to 206 and simply complete the PIN login process using steps 208 to 216.

Within the system 100, the user is able to view the communication history and complete various actions; e.g. read emails, review email chains, send further emails. When the user chooses to send emails to group members, the email is logged on the system and then the secure server 102 sends a message to any other members of that relationship.

Relationship Configuration Method

Figure 6:
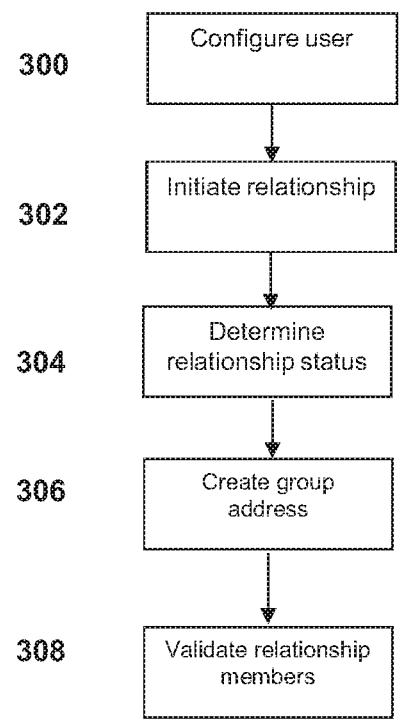
FIG. 6 is a flowchart illustrating a method in accordance with embodiments of the present disclosure.

A method for communicating with one or more users will now be described with reference to FIG. 6. FIG. 6 shows a flow chart illustrating a method according to an embodiment of the present disclosure. The following method is applicable once the user has logged on to the system 100 in accordance with the methods discussed above.

Step 300: Configure User

Once a user has logged on to the system in accordance with steps 200 to 216, the user is allocated a user email address internal to the system 100. The user email address will normally be of the format username@securecompanyname.com.

The internal email address can be used in conjunction with external email or can be emailed directly if the relevant security protocols allow that action to occur. The method proceeds to step 302.

Step 302: Initiate Relationship

At step 302, the user can initiate a relationship. This is done by contacting one or more other users within the system 100. If the user is a member of a company, the user may contact new users to join the system or invite new users into a group. Alternatively or additionally, administrators may set up new users directly by entering their details into the system. The method proceeds to step 304.

Step 304: Determine Relationship Status

If the relationship is a one-to-one relationship (i.e. between only two users) then the method proceeds directly to step 308. However, if the relationship is a group relationship, then the method proceeds to step 306.

Step 306: Create Group Address

If the relationship is a group relationship (i.e. if more than two members are party to the relationship), then a dedicated email address is then generated for the group relationship. The method proceeds to step 308.

Step 308: Validate Relationship Members

Once the relationship has been initiated, a verification process may then ensue, whereby the other user or users agree to be part of the relationship. This may be done through email links sent to the user's external email address or SMS number. If the relationship is a group relationship, the users will be provided with the group address to enable group communication.

Communication Method

Figure 7:
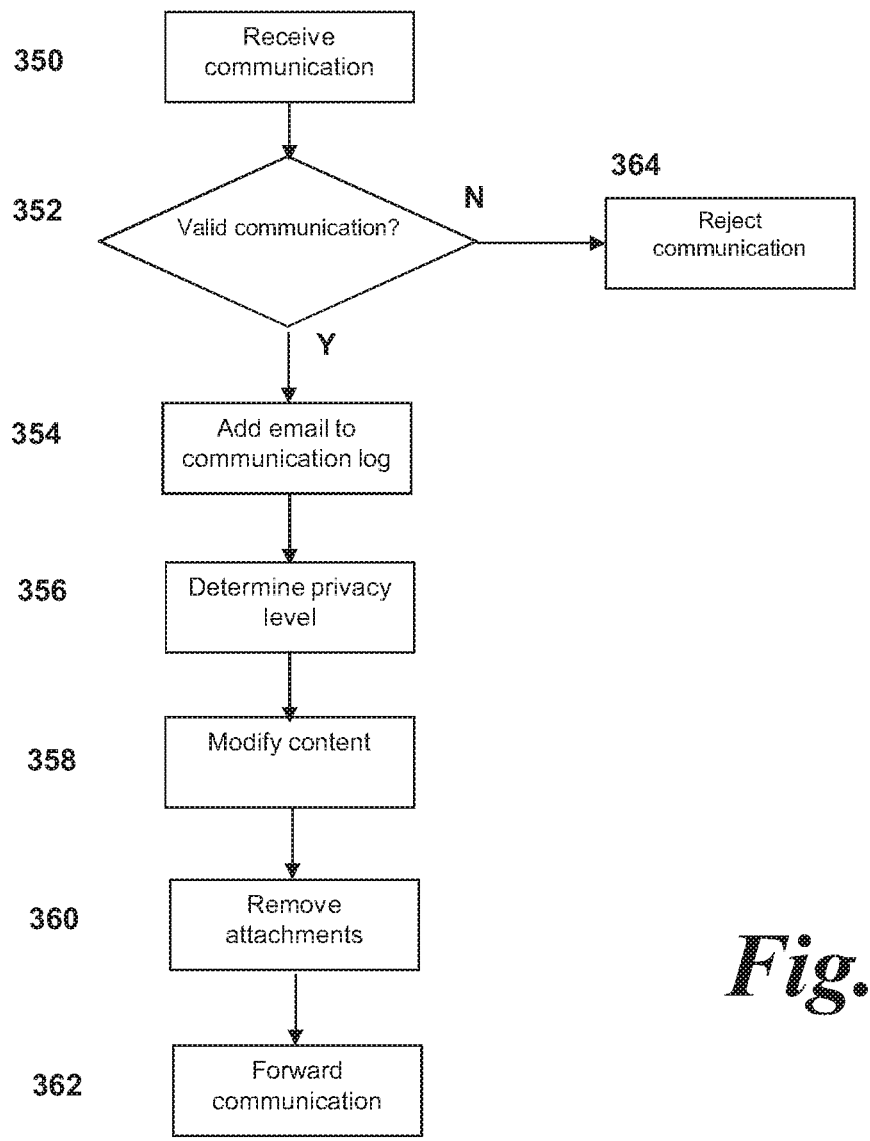
FIG. 7 is a flowchart illustrating a method in accordance with embodiments of the present disclosure.

A method for receiving and sending communications will now be described. In the following method, a group relationship has been formed and a group address allocated. FIG. 7 shows a flow chart according to an embodiment of the present disclosure.

Step 350: Receive Communication

At step 350, a communication is sent into the relationship. This may be done from within the user interface 110. Alternatively, a communication may be sent from an external email address (e.g. one not associated with the secure server 102 and database 104) to the group email address allocated in, for example, step 306.

The communication may be in any suitable form; for example, an email, a SMS or an instant message. The method proceeds to step 352.

Step 352: Valid Communication?

At step 352, the secure server 102 determines whether the communication received in step 350 is a valid communication. The secure server 102 may be configured to determine one or more parameters of the incoming communication to determine the validity of the communication.

For example, in non-limiting embodiments, the secure server 102 may only validate a communication in a situation where the communication is from an address or contact that is a party to the group relationship or is from a pre-defined allowable source. A pre-defined allowable source may comprise, for example, a file sharing service, a document signing service or any other pre-defined and independently validated third party.

If the communication is not from a valid source, the method proceeds to step 364 where communication is rejected. If the communication is determined to be from a valid source, then the method proceeds to step 354.

Step 354: Add Communication to Communication Log

At step 354, the communication (which may be an email/SMS/instant message etc.) is added to the communication log. The communication log is viewable within the user interface 110 and within the relevant relationship.

All valid participants can view the email communication log from within their respective user interface 110. If a communication is sent from an external source (e.g. external email address or SMS) then the communication will be marked to notify readers of this. For example, the header of an email may be marked as from the external email address.

Optionally, one or more users may receive a notification such as a SMS, email, message alert or other communication to notify them that the communication log has been modified, changed or added to. This notification is in addition to any forwarded communication that may also be sent. The method proceeds to step 356.

Step 356: Determine Privacy Level of Communication

Valid communications received in the system 100, either from an internal address or from an external address, are processed in accordance with particular privacy rules. The privacy rules may comprise user selectable privacy settings, or may comprise predefined privacy settings.

The privacy rules determine what content of the communication can be viewed externally of the user interface 110. If a low privacy setting is used, then the content of the communication can be viewed externally of the user interface 110 and secure server 102 by, for example, forwarding the email on to the user's external email accounts or their SMS/instant messaging accounts.

However, if the privacy level is high, then the full content of the communication may not be visible externally of the user interface 110. The method proceeds to step 358.

Step 358: Modify Content

At step 358, the content of the communication is modified based on the privacy setting determined in step 356.

If the communication has a high privacy setting (i.e. is "private") then the content of the communication is not available outside of the user interface 110. Consequently, all private content of the communication (e.g. email or SMS) is removed or amended as required. The only content available to the recipient outside of the user interface 110 is the name of the sender.

This could be done in a number of ways. For example, the header information and title/first line of the communication may be retained, but all other content removed. Alternatively, nothing but the title of the email may be forwarded externally of the secure server 102.

In the alternative, if the communication has a low privacy setting then different extraction protocols will apply. For example, the entire content of the communication may be sent externally of the secure server 102 and user interface 110, or only some of the content may be sent. Once the content to be sent has been determined, the method proceeds to step 360.

Step 360: Remove Attachments

At step 360, all attachments are removed from the communication to be forwarded. Attachments (e.g. attached documents such as pdf, text files, video files, photograph files etc.) are a potential source of malware and other fraudulent and malicious content. Therefore, attachments are not sent with any forwarded communications and are retained within the secure server 102 and are accessible when the user logs in to the user interface 110. The method proceeds to step 362.

Step 362: Forward Communication

At step 362, the communication (with attachments removed in step 360 and content adapted in step 358) is forwarded to the external addresses associated with the users party to the relevant relationship group.

The forwarded communication may, in the case of an email, SMS or instant message, comprise a "smart link" as discussed above to enable a user to access easily the user interface 110 to read the content of the communication.

Step 364: Reject Communication

If at step 352, it is determined that the communication is not from a valid source, the communication is rejected by the secure server 102. Additionally or optionally, the communication source may be blocked from sending further communication to the secure server 102 and/or the group address.

The above protocol and method has advantages in that users can reply from either their external communication methods (e.g. by emailing a group address or a user's address within the secure area) or their internal secure area (e.g. by logging in via the user interface 110 and replying to communications from that environment).

In either scenario, security is ensured by a) the validation of any incoming communication from an external source and/or b) the sending of a communication from within an independently validated secure area.

It is to be noted that the above method represents an exemplary embodiment of the present disclosure and variations would be apparent to the skilled person. Further variations to the above method are possible.

The methods as described herein may be executed on various different computer systems or testing environments as would be understood by the skilled person. For example, the user and relationship data and/or attachment data may be stored upon an external memory/storage device that is remote from the secure server 102. The external device may be a central server or other computer system with access to one or more communication devices such that one or multiple computing devices can send or retrieve data to/from the server.

The secure server 102 may operate one or more databases or other information handling systems on one or more memory devices. The databases may store multiple databases. One database, or a part of one or more databases, may be available to the secure server 102 or a set of one or more secure servers 102 to enable data sharing between servers.

The methods described herein may be embodied in one or more pieces of software. The software is preferably held or otherwise encoded upon a memory device such as, but not limited to, any one or more of, a hard disk drive, RAM, ROM, solid state memory or other suitable memory device or component configured to software. The methods may be realized by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

What is claimed is:

1. A method for secure electronic communication between one or more clients on one or more client computing devices, the method comprising:

establishing a secure exchange server, the secure exchange server comprising one or more secure electronic data exchange environments configured to enable secure communication between one or more clients;

providing a client authentication interface operable to enable authentication of one or more clients on one or more secure electronic data exchange environments and to enable one or more authorized clients to access one or more of the secure electronic data exchange environments across a network; and enabling one or more of the authorized clients to exchange electronic communications through one or more secure electronic data exchange environments, wherein the authentication comprises:

storing, in a database of the secure exchange server, client authentication data;

receiving, from a client through a client authentication interface, login information;

determining whether said client login information is associated with the secure electronic data exchange environment;

if so determined, requesting further login information from the client through the client authentication interface;

validating said further login information; and providing access to the secure electronic data exchange environment if said further login information is validated, wherein, for subsequent authentication processes through the said client authentication interface, only the further login information is required to enable the client to access the secure electronic data exchange environment.

2. The method according to claim 1, wherein one or more secure electronic data exchange environments and/or one or more clients are associated with an organization.

3. The method according to claim 2, wherein the or each client authentication interface for the or each secure electronic data exchange environment is specific to the associated organization.

4. The method according to claim 2, wherein only clients associated with an organization are able to access the secure electronic data exchange environment for that organization.

5. The method according to claim 1, wherein the client authentication interface s configured to display to authorized clients a log of all client communication within a respective secure electronic data exchange environment.

6. The method according to claim 1, wherein each authorized client has an email address specific to the relevant secure electronic data exchange environment and/or each secure electronic data exchange environment has an associated email address.

7. The method according to claim 6, wherein the secure electronic data exchange environment is further configured such that electronic communications can be sent to the associated email address of said authorized clients and/or said secure electronic data exchange environment 8. The method according to claim 7, further comprising:
  storing, in a database of the secure exchange server, authorized external communication addresses associated with said secure electronic data exchange environment;
  receiving a communication from an external communication address;
  determining whether said communication is from an authorized external communication address; and
  if so determined, enabling said communication to be accessible by authorized clients within the secure electronic data exchange environment.

9. The method according to claim 8, wherein said communication from an external communication address is added to a communication log within said secure electronic data exchange environment.

10. The method according to claim 1, wherein one or more authorized clients are notified when electronic communications are exchanged within an associated electronic data exchange environment.

11. The method according to claim 10, wherein the said notification comprises sending a communication to an electronic address external to said secure electronic data exchange environment and secure exchange server.

12. The method according to claim 11, wherein said electronic address comprises an external email address and/or an SMS number.

13. The method according to claim 11, wherein the content of the communication sent to the electronic address external to said secure electronic data exchange is determined in dependence upon a privacy level associated with the or each authorized client and/or the secure electronic data exchange environment.

14. The method according to claim 11, wherein the communication sent to the electronic address external to said secure electronic data exchange comprises an electronic link to the respective client authentication interface.

15. A non-transitory computer readable medium comprising instructions that, when executed by a processor, cause the processor to:
  establish a secure exchange server, the secure exchange server comprising one or more secure electronic data exchange environments configured to enable secure communication between one or more clients;
  provide a client authentication interface operable to enable authentication of one or more clients on one or more secure electronic data exchange environments and to enable one or more authorized clients to access one or more of the secure electronic data exchange environments across a network; and
  enable one or more of the authorized clients to exchange electronic communications through one or more secure electronic data exchange environments, wherein the authentication comprises:
    storing, in a database of the secure exchange server, client authentication data;
    receiving, from a client through a client authentication interface, login information;
    determining whether said client login information is associated with the secure electronic data exchange environment;
    if so determined, requesting further login information from the client through the client authentication interface;
    validating said further login information; and
    providing access to the secure electronic data exchange environment if said further login information is validated, wherein, for subsequent authentication processes through the said client authentication interface, only the further login information is required to enable the client to access the secure electronic data exchange environment.

16. A computer system comprising:
  a data storage device; and
  a processor device coupled to the data storage device and configured to:
    establish a secure exchange server, the secure exchange server comprising one or more secure electronic data exchange environments configured to enable secure communication between one or more clients;
    provide a client authentication interface operable to enable authentication of one or more clients on one or more secure electronic data exchange environments and to enable one or more authorized clients to access one or more of the secure electronic data exchange environments across a network; and
  enable one or more of the authorized clients to exchange electronic communications through one or more secure electronic data exchange environments, wherein the authentication comprises:
    storing, in a database of the secure exchange server, client authentication data;
    receiving, from a client through a client authentication interface, login information;
    determining whether said client login information is associated with the secure electronic data exchange environment;
    if so determined, requesting further login information from the client through the client authentication interface;
    validating said further login information; and
  providing access to the secure electronic data exchange environment if said further login information is validated, wherein, for subsequent authentication processes through the said client authentication interface, only the further login information is required to enable the client to access the secure electronic data exchange environment.

* * * * *